United States Patent Office 2,905,725
Patented Sept. 22, 1959

2,905,725
PARTIAL DEHALOGENATION OF HALOBICYCLO COMPOUNDS

Louis Schmerling, Riverside, Ill., assignor, by mesne assignments, to Universal Oil Products Company, Des Plaines, Ill., a corporation of Delaware No Drawing. Application April 25, 1956
Serial No. 580,467

15 Claims. (Cl. 260—648)

This application is a continuation-in-part of my co-pending application Serial No. 342,753, which was filed March 16, 1953, now abandoned.

The present invention relates to methods for partially dehalogenating certain polyhalobicyclo-olefinic compounds, and more particularly to partial dehalogenation of polyhalobicyclic heptenes.

I have now found that the products of the condensation of a conjugated cycloalkadiene with a particular class of haloolefins contain active halogen radicals and may be partially dehalogenated in the presence of a dehalogenating agent to form the desired halobicycloalkadiene.

It is, therefore, an object of this invention to prepare a halobicycloalkadiene by partially dehalogenating a polyhalobicycloalkene.

A further object of this invention is to first prepare a polyhalobicycloalkene and partially dehalogenate said alkene to form a halobicycloalkadiene.

One embodiment of this invention is found in a process for the preparation of a halobicycloalkadiene which comprises condensing a conjugated cycloalkadiene with a polyhaloolefin having the general formula

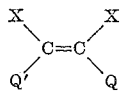

in which X is a halogen radical, Q is a radical selected from the group consisting of hydrogen, halogen, alkyl and haloalkyl radicals and Q' is a radical selected from the group consisting of halogen and haloalkyl radicals, thereby forming a polyhalobicycloalkene containing at least one halogen atom on each of two adjacent carbon atoms, partially dehalogenating said polyhalobicycloalkene in the presence of a dehalogenating agent to form a halobicycloalkadiene, and recovering the latter compound.

A specific embodiment of the invention resides in a process for the preparation of a halobicycloheptadiene which comprises reacting cyclopentadiene with a polyhaloolefin having the general formula

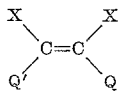

in which X is a halogen radical, Q is a radical selected from the group consisting of hydrogen, halogen, alkyl and haloalkyl radicals and Q' is a radical selected from the group consisting of halogen and haloalkyl radicals thereby forming a polyhalobicycloheptene containing at least one halogen atom on each of two adjacent carbon atoms, partially dehalogenating said polyhalobicycloheptene in the presence of a metal and an organic solvent to form a halobicycloheptadiene, and recovering the latter compound.

A more specific embodiment of the invention resides in a process for the preparation of 2-chlorobicyclo [2.2.1]-2,5-heptadiene which comprises reacting cyclopentadiene with 1,1,2-trichloroethylene to form 5,5,6-trichlorobicyclo [2.2.1]-2-heptene, partially dehalogenating said heptene in the presence of zinc and methanol to form 2-chlorobicyclo [2.2.1]-2,5-heptadiene, and recovering the latter compound.

Yet another embodiment of the invention resides in a process for the preparation of a halobicycloalkadiene which comprises dehalogenating a polyhalobicycloalkene, containing at least three halogen atoms, at least one halogen atom being on each of two adjacent carbon atoms, in the presence of a dehalogenating agent comprising a metal and an organic solvent to form a halobicycloalkadiene, and recovering the latter compound.

Another more specific embodiment of the invention is found in a process for the preparation of 2-chlorobicyclo [2.2.1]-2,5-heptadiene which comprises dehalogenating 5,5,6-trichlorobicyclo[2.2.1]-2-heptene in the presence of zinc and methanol to form 2-chlorobicyclo[2.2.1]-2,5-heptadiene, and recovering the latter compound.

Other objects and embodiments referring to alternative reactants utilizable as charging stock in the present process and to alternative dehalogenating agents within the scope of this invention will be referred to in greater detail in the following further detailed description of the invention.

It has now been discovered that halobicycloalkadiene having the following formula

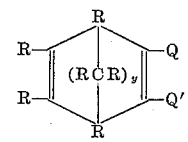

in which Q represents a hydrogen, halogen, alkyl or haloalkyl radical, Q' represents a halogen or haloalkyl radical, y is an integer from 1 to 4, preferably 1 or 2, and R is independently selected from the group consisting of hydrogen and alkyl radicals may be synthesized by reacting a conjugated cycloalkadiene with a polyhaloolefin having the general formula

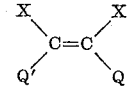

in which X represents a halogen radical, Q represents a hydrogen, halogen, alkyl or haloalkyl radical and Q' represents a halogen or haloalkyl radical to form a polyhalobicycloalkene, and partially dehalogenating the resultant compound to remove two halogen atoms, thus yielding the desired halobicycloalkadiene. The reaction between the conjugated cycloalkadiene and the polyhaloolefin is by nature a thermal condensation and occurs in the absence of any added catalyst. In addition, the reactants are preferably present in a molar ratio in the range of from about 0.5:1 to about 0.9:1 mole of cycloalkadiene to polyhaloolefin. The excess of polyhaloolefin is preferred in order to insure the production of a bicyclic compound instead of a tetracyclic compound which may occur if the cycloalkadiene is in excess. The halobicycloalkadienes which are the desired products of the present invention are useful as intermediates in the preparation of insecticides, pharmaceuticals, resins and plastics. For instance, a halobicycloalkadiene such as 2-chlorobicyclo [2.2.1]-2,5-heptadiene which may be prepared in the process of this invention may be reacted with hexachlorocyclopentadiene to form 1,2,3,4,6,10,10-heptachloro-1, 4,4a,5,8,8a - hexahydro - 1,4,5,8 - dimethanonaphthalene which is an effective insecticide against houseflies, Mexican bean beetles, pea aphids, etc.

When cyclopentadiene is used as a feed stock, the reaction using trihaloethylene will proceed according to the following equation:

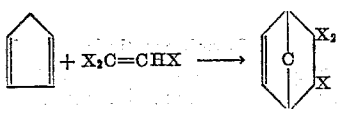

The trihalobicycloheptene will then be dehalogenated by means of a dehalogenating agent such as a metal, particularly zinc or magnesium, and an alcohol according to the following equation to prepare the monohalobicycloheptadiene.

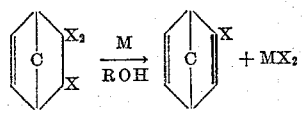

In the above equation X is a halogen, M is a metal and ROH is an alcohol.

A more specific example of the above method of preparing a halobicycloheptadiene is found in the following equations in which cyclopentadiene is reacted with 1,1,2-trichloroethylene and the resulting compound, comprising 5,5,6-trichlorobicyclo-[2.2.1]-2-heptene is dehalogenated with zinc in an ethyl alcohol medium to form the desired 2-chlorobicyclo[2.2.1]-2,5-heptadiene.

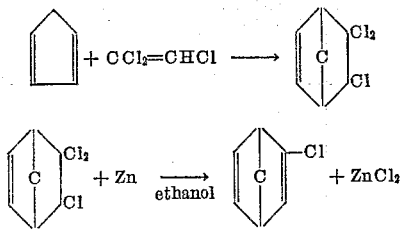

As hereinbefore stated one component of the feed stock is selected from the group of compounds consisting of conjugated cycloalkadienes, such compounds including 1,3-cyclopentadiene (hereinafter referred to as cyclopentadiene), 1,3 - cyclohexadiene, 1,3 - cycloheptadiene, 1,3-cyclooctadiene, etc., alkyl substituted cyclopentadienes such as 5-methylcyclopentadiene, 5-ethylcyclopentadiene, 5,5-dimethylcyclopentadiene, 1,2-dimethylcyclopentadiene, etc., 1 - methyl - 1,3 - cyclohexadiene, 1-ethyl-1,3-cyclohexadiene, 1,2-dimethyl-1,3-cyclohexadiene, 1,3-dimethyl-1,3-cyclohexadiene, 1,2-diethyl-1,3-cyclohexadiene, etc. Cyclopentadiene and alkyl substituted cyclopentadienes are the preferred reactants in this process due to their relatively greater availability and because they yield a preferred type of bicycloalkadiene.

The polyhaloolefin compound which, as hereinbefore set forth, has the general formula

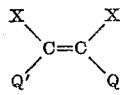

in which X, Q and Q' represent radicals hereinbefore set forth may include 1,1,2-trichloroethylene, 1,1,2-tribromoethylene, 1,1,2-trifluoroethylene, 1,1,2-triiodoethylene, tetrachloroethylene, tetrabromoethylene, tetrafluoroethylene, tetraiodoethylene, 1,1,2-trichloro-1-propene, 1,1,2-tribromo-1-propene, 1,1,2-trifluoro-1-propene, 1,1,2-triiodo - 1 - propene, 1,1,2 - trichloro - 1 - butene, 1,1,2-tribromo-1-butene, 1,1,2-trifluoro-1-butene, 1,1,2-triiodo-1 - butene, 1,1,2 - trichloro - 1 - pentene, 1,1,2 - tribromo-1-pentene, 1,1,2-trifluoro-1-pentene, 1,1,2-triiodo-1-pentene, 1,1,2-trichloro-1-hexene, 1,1,2-tribromo-1-hexene, 1,1,2-trifluoro-1-hexene, 1,1,2-triiodo-1-hexene, 1,2,3-trichloro - 1 - propene, 1,2,3 - tribromo - 1 - propene, 1,2,3-trifluoro - 1 - propene, 1,2,3 - triiodo - 1 - propene, 1,2,3-trichloro-1-butene, 1,2,3-tribromo-1-butene, 1,2,3-trifluoro-1-butene, 1,2,3-triiodo-1-butene, 1,2,3-trichloro-1-pentene, 1,2,3-tribromo-1-pentene, 1,2,3-trifluoro-1-pentene, 1,2,3-triiodo-1-pentene, 1,2,3,3-tetrachloro-1-propene, 1,2,3,3-tetrabromo-1-propene, 1,2,3,3-tetrafluoro-1-propene, 1,2,3,3-tetraiodo-1-propene, 1,2,4,4-tetrachloro-1-butene, 1,2,4,4-tetrabromo-1-butene, 1,2,4,4-tetrafluoro - 1 - butene, 1,2,4,4 - tetraiodo - 1 - butene, 1,1,2,3-tetrachloro-2-butene, 1,1,2,3-tetrabromo-2-butene, 1,1,2,3 - tetrafluoro - 2 - butene, 1,1,2,3 - tetraiodo - 2-butene, 1,2,3,4-tetrachloro-1-butene, 1,2,3,4-tetrabromo-1-butene, 1,2,3,4-tetrafluoro-1-butene, 1,2,3,4-tetraiodo-1-butene, 1,2,3,4-tetrachloro-2-butene, 1,2,3,4-tetrabromo-2-butene, 1,2,3,4-tetrafluoro-2-butene, 1,2,3,4-tetraiodo-2-butene, 1,1,2,3,4-pentachloro-1-butene, 1,1,2,3,4-pentabromo-1-butene, 1,1,2,3,4-pentafluoro-1-butene, 1,1,2,3,4-pentaiodo - 1 - butene, 1,1,2,3,4 - pentachloro - 2 - butene, 1,1,2,3,4 - pentabromo - 2 - butene, 1,1,2,3,4 - pentafluoro-2-butene, 1,1,2,3,4-pentaiodo-2-butene, 1,1,2,3,4,4-hexachloro - 1 - butene, 1,1,2,3,4,4 - hexabromo - 1 - butene, 1,1,2,3,4,4 - hexafluoro - 1 - butene, 1,1,2,3,4,4 - hexaiodo-1-butene, 1,1,2,3,4,4-hexachloro-2-butene, 1,1,2,3,4, 4 - hexabromo - 2 - butene, 1,1,2,3,4,4 - hexafluoro - 2-butene, 1,1,2,3,4,4-hexaiodo-2-butene, etc. It is to be understood that the above enumerated conjugated cycloalkadienes and polyhaloolefins are only representatives of the compounds which may be used, and that this invention is not necessarily limited thereto.

The partial dehalogenation of the polyhalobicycloalkenes resulting from the reaction between the conjugated cycloalkadienes and the polyhaloolefin is effected by treating said compounds in a suitable organic solvent including alcohols, ketones, ethers, etc., in the presence of a dehalogenating agent. The dehalogenating agents which may be used in this invention include metals of the right-hand column of group II of the periodic table such as magnesium, zinc and cadmium. The particular alcohol, ketone or ether which is used as the organic solvent in the dehalogenating reaction will depend upon the temperature at which the reaction occurs. Alcohols which are utilizable in this reaction include methyl, ethyl, n-propyl, isopropyl, n-butyl, isobutyl, amyl, etc.; ketones which may be used include acetone, methylethyl ketone, diethyl ketone, methylpropyl ketone, etc.; ethers such as ethyl ether, methylethyl ether, isopropyl ether, etc.; may also be used. A mixture of magnesium and magnesium iodide in ether is an active dehalogenating agent. A solution of sodium iodide in acetone may also be used in some cases, particularly for the partial dehalogenation of polychloro and polybromo compounds, but not necessarily with equivalent results.

The operating conditions under which the process of the present invention is conducted will, to some extent, depend upon the particular compounds employed in the reaction. The temperature for the reaction between the particular conjugated cycloalkadiene and the polyhaloolefin in which a polyhalobicycloalkene is formed will range from about atmospheric to about 250° C. or more, the preferred range being from about 100° to about 200° C. Likewise, the partial dehalogenation step of this process will also occur at temperatures depending upon the particular reactants and the solvent which is used as a medium for the reaction. Suitable temperatures will usually lie in the range of from about 50° to about 250° C., the preferred range being from about 75° to about 200° C. In addition, the reaction will usually take place at atmospheric pressure, however, when the reaction temperature is in a higher range than the boiling point of the solvent, superatmospheric pressures may be employed.

The process of this invention may be effected in any suitable manner and may comprise either a batch or a continuous type operation. When a batch type operation is used, a quantity of the reactants comprising the conjugated cycloalkadiene and the polyhaloolefin is placed in a reactor provided with a mixing and heating device. The reactor is heated to the desired temperature while thoroughly admixing the contents thereof. After a suitable period of time has elapsed, the reactor and its contents are cooled to room temperature, after which the desired product is recovered by suitable means, for example, by fractional distillation or other means known in the art, while the unreacted feed stock may be recharged to form a portion of the starting material of the next batch. The desired product is then placed in a second reactor, or if so desired, returned to the same reactor and the dehalogenating agent and organic solvent added thereto. The reactor is then heated to the desired temperature until the reaction is completed, after which the halobicycloalkadiene is separated by means hereinbefore set forth while the organic solvent and dehalogenating agent are recovered for further use in subsequent batches.

Another method of operation of the present process is of the continuous type. In this operation the reactants comprising the conjugated cycloalkadiene and the polyhaloolefin are continuously charged to a reactor provided with heating and mixing means. The reactor may comprise an unpacked vessel or coil or may be lined with an adsorbent packing material such as dehydrated bauxite, alumina and the like, said reactor being maintained at suitable operating conditions of temperature and pressure. The desired reaction product comprising a polyhalobicycloalkene is continuously withdrawn from this vessel by suitable means and charged into a second reactor also maintained at suitable operating conditions, while the unreacted feed stock from the first reactor may be withdrawn and recycled for use as a part of the fresh feed stock. The dehalogenating agent, comprising, for example, a metal of the type hereinbefore set forth, either in solid or fluidized form along with the solvent which acts as a medium in which the partial dehalogenation takes place are also charged to the aforesaid second reactor by suitable means. The partially dehalogenated compound, comprising a halobicycloalkadiene, is continuously withdrawn from this second reactor and purified by conventional means hereinbefore set forth, while the unreacted material may be recycled to form a portion of the feed stock.

As hereinbefore set forth the halobicycloalkadiene prepared in the above manner may be reacted with a polyhalocycloalkadiene such as hexachlorocyclopentadiene to form polyhalo tetracyclic compounds which are useful as insecticides. The condensation of the halobicycloalkadiene and the hexachlorocyclopentadiene is carried out in a similar manner to the reaction between the conjugated cycloalkadiene and the polyhaloolefin containing at least one halogen atom on each of the doubly bonded carbon atoms as hereinbefore described. The temperature at which the reaction is to be carried out will be in the range of from about atmospheric to about 250° C. or more, the preferred range being from about 60° to about 200° C. In addition, the reaction may be effected in any suitable manner, either a batch or a continuous type operation similar to that hereinbefore described with reference to the reaction between the cycloalkadiene and the polyhaloolefin. In the batch type operation the reactants comprising the hexachlorocyclopentadiene and the halobicycloalkadiene are placed in a reactor provided with heating and mixing devices. This reactor is heated and maintained at the desired temperature until the reaction is completed after which the reactor is cooled to room temperature and the desired reaction product withdrawn, separated and purified by conventional means such as fractional distillation, crystallization, etc.

When a continuous type operation is used the reactants may be introduced into a reactor through lines provided therefore, said reactor being equipped with heating and mixing means and maintained at the desired operating conditions of temperature and pressure. The desired product is withdrawn and purified while the unconverted material may be recycled and used as part of the feed stock, or mixed with fresh starting materials. It is also contemplated within the scope of this invention, that this latter reaction may take place in the presence of inert diluents, e.g. liquid aromatic hydrocarbons such as benzene, toluene, etc.

The present invention is further illustrated with respect to specific embodiments thereof in the following examples which, however, are not intended to limit the generally broad scope of the present invention in strict accordance therewith.

*Example I*

This example illustrates the preparation of 2-chlorobicyclo[2.2.1]-2,5-heptadiene. 91 g. (1.4 moles) of cyclopentadiene and 210 g. (1.6 moles) of 1,1,2-trichloroethylene were placed in a glass liner of a rotating autoclave. The reaction mixture was heated under 30 atmospheres of initial nitrogen pressure at approximately 180° C. for a period of six hours. At the end of this time the vessel and its contents were cooled to room temperature, the reaction product consisting of 297 g. of an amber liquid. The liquid was taken up in pentane, washed with dilute alkali and water, dried and subjected to fractional distillation. A yield of 83 g. of a material boiling at 85–87° C. at 7.5 mm. pressure was obtained. This material became partially crystalline upon standing, filtration of this product yielding 25 g. of a crystalline material melting at 51° C. and 26 g. of an oil, said oil and the crystalline material apparently being stereoisomers. The crystals and oil were subjected to analysis, the results being set forth below.

*Analysis.*—Calculated for $C_7H_7Cl_3$ (5,5,6-trichlorobicyclo[2.2.1]-2-heptene): C, 42.56; H, 3.57; Cl, 53.87. Found for crystalline material: C, 42.91; H, 3.81; Cl, 53.51. Found for oil: C, 44.36; H, 3.91; Cl, 51.75.

24 g. of the crystalline material 5,5,6-trichlorobicyclo[2.2.1]-2-heptene in 100 cc. of propanol was heated under reflux conditions (approximately 100° C.) with 10 g. of zinc dust for a period of approximately 16 hours. The product obtained from this refluxing was washed with water, extracted with pentane, washed, dried and subjected to fractional distillation yielding 9 g. of 2-chlorobicyclo[2.2.1]-2,5-heptadiene having a boiling point of 66–68° C. at 73 mm. pressure or 136–138° C. at 760 mm. pressure. The product was subjected to analysis, the results appearing below.

*Analysis.*—Calculated for $C_7H_7Cl$ (2-chlorobicyclo[2.2.1]-2,5-heptadiene): C, 66.41; H, 5.58; Cl, 28.01. Found: C, 65.61; H, 5.65; Cl, 27.37.

20 g. of the oil were treated with 9.5 g. of zinc dust suspended in 100 cc. of propanol in a vessel equipped with refluxing means. This temperature was also maintained at 99–100° C. for a period of 16 hours. The product maintained from this refluxing was treated with water and the water and soluble product was thereafter recovered in ether. Following this, the product was washed with water, dried and subjected to fractional distillation. 5 g. of 2-chlorobicyclo[2.2.1]-2,5-heptadiene having a boiling point of 136–137° C. at atmospheric pressure were obtained.

*Example II*

This example illustrates the preparation of 2-chloro-3-methylbicyclo[2.2.1]-2,5-heptadiene. 1.4 moles of cyclopentadiene and 1.8 moles of 1,1,2-trichloro-1-propene are placed in a glass liner of a rotating autoclave after which the reaction mixture is heated at a temperature of approximately 180° C. for a period of six hours under 30 atmospheres of initial nitrogen pressure. At the end of this time the vessel and contents are cooled to room temperature and the reaction product is taken up in pentane, washed with dilute alkali and water, dried and subjected to fractional distillation. The desired product, comprising 5,5,6 - trichloro - 6 - methylbicyclo[2.2.1]-2-heptene is separated therefrom. The aforementioned reaction product is heated under reflux conditions (approximately 100° C.) with zinc dust in propanol for a period of approximately 16 hours. The product obtained from this refluxing is washed with water, extracted with alcohol, washed, dried and subjected to fractional distillation, the cut comprising 2-chloro-3-methylbicyclo-[2.2.1]-2,5-heptadiene being recovered therefrom.

*Example III*

This example illustrates the preparation of 2-bromobicyclo[2.2.1]-2,5-heptadiene. 1.0 mole of cyclopentadiene and 1.4 moles of 1,1,2-tribromoethylene are placed in a glass liner of a rotating autoclave, heated to a temperature of approximately 180° C. and maintained thereat for a period of about six hours under an initial nitrogen pressure of about 30 atmospheres. At the end of this time the vessel and contents thereof are cooled to room temperature and the reaction product separated from unreacted material by similar methods hereinbefore set forth. The reaction product is then subjected to fractional distillation under reduced pressure and the cut comprising 5,5,6-tribromobicyclo[2.2.1]-2-heptene is separated therefrom.

The above mentioned 5,5,6-tribromobicyclo[2.2.1]-2-heptene is treated with magnesium in a solvent comprising ethanol and maintained at reflux conditions (approximately 80° C.) for a period of about 16 hours. The product obtained from this reflux is washed with water, extracted from pentane, washed, dried and subjected to fractional distillation, said distillation yielding 2-bromobicyclo[2.2.1]-2,5-heptadiene.

I claim as my invention:

1. A process for the preparation of a halobicycloalkadiene which comprises reacting a conjugated cycloalkadiene at a temperature of from about atmospheric to about 250° C. with a polyhaloolefin having the general formula:

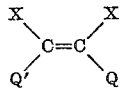

in which X is a halogen radical, Q is a radical selected from the group consisting of hydrogen, halogen, alkyl and haloalkyl radicals and Q' is a radical selected from the group consisting of halogen and haloalkyl radicals, in a molar ratio to form a polyhalobicycloalkene containing at least one halogen atom on each of two adjacent carbon atoms, partially dehalogenating said polyhalobicycloalkene by reaction with a metal in the right-hand column of group II of the periodic table at a temperature of from about 50° C. to about 250° C. to form a halobicycloalkadiene, and recovering the latter compound.

2. A process for the preparation of a halobicycloalkadiene which comprises reacting a conjugated cycloalkadiene at a temperature of from about atmospheric to about 250° C. with a polyhaloolefin having the general formula:

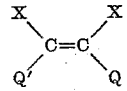

in which X is a halogen radical, Q is a radical selected from the group consisting of hydrogen, halogen, alkyl and haloalkyl radicals and Q' is a radical selected from the group consisting of halogen and haloalkyl radicals, in a molar ratio to form a polyhalobicycloalkene containing at least one halogen atom on each of two adjacent carbon atoms, partially dehalogenating said polyhalobicycloalkene by reaction with a metal in the right-hand column of group II of the periodic table at a temperature of from about 50° C. to about 250° C. in the presence of an organic solvent to form a halobicycloalkadiene, and recovering the latter compound.

3. A process for the preparation of a halobicycloalkadiene which comprises reacting a conjugated cycloalkadiene at a temperature of from about atmospheric to about 250° C. with a polyhaloolefin having the general formula:

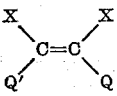

in which X is a halogen radical, Q is a radical selected from the group consisting of hydrogen, halogen, alkyl and haloalkyl radicals and Q' is a radical selected from the group consisting of halogen and haloalkyl radicals, in a molar ratio to form a polyhalobicycloalkene containing at least one halogen atom on each of two adjacent carbon atoms, partially dehalogenating said polyhalobicycloalkene by reaction with zinc at a temperature of from about 50° C. to about 250° C. in the presence of an alcohol to form a halobicycloalkadiene, and recovering the latter compound.

4. A process for the preparation of a halobicycloalkadiene which comprises reacting a conjugated cycloalkadiene at a temperature of from about atmospheric to about 250° C. with a polyhaloolefin having the general formula:

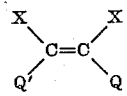

in which X is a halogen radical, Q is a radical selected from the group consisting of hydrogen, halogen, alkyl and haloalkyl radicals and Q' is a radical selected from the group consisting of halogen and haloalkyl radicals, in a molar ratio to form a polyhalobicycloalkene containing at least one halogen atom on each of two adjacent carbon atoms, partially dehalogenating said polyhalobicycloalkene by reaction with magnesium at a temperature of from about 50° C. to about 250° C. in the presence of alcohol to form a halobicycloalkadiene, and recovering the latter compound.

5. A process for the preparation of halobicycloalkadiene which comprises reacting a conjugated cycloalkadiene at a temperature of from about atmospheric to about 250° C. with a polyhaloolefin having the general formula:

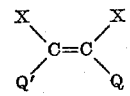

in which X is a halogen radical, Q is a radical selected from the group consisting of hydrogen, halogen, alkyl and haloalkyl radicals and Q' is a radical selected from the group consisting of halogen and haloalkyl radicals, in a molar ratio to form a polyhalobicycloalkene containing at least one halogen atom on each of two adjacent carbon atoms, partially dehalogenating said polyhalobicycloalkene by reaction with magnesium at a temperature of from about 50° C. to about 250° C. in the presence of an ether to form a halobicycloalkadiene, and recovering the latter compound.

6. A process for the preparation of a halobicycloheptadiene which comprises reacting cyclopentadiene at a temperature of from about atmospheric to about 250° C. with a polyhaloolefin having the general formula:

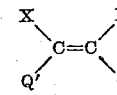

in which X is a halogen radical, Q is a radical selected from the group consisting of hydrogen, halogen, alkyl and haloalkyl radicals and Q' is a radical selected from the group consisting of halogen and haloalkyl radicals, in a molar ratio to form a polyhalobicycloheptene containing at least one halogen atom on each of two adjacent carbon atoms, partially dehalogenating said polyhalobicycloheptene by reaction with a metal in the right-hand column of group II of the periodic table at a temperature of from about 50° C. to about 250° C. in the presence of an organic solvent to form a halobicycloheptadiene, and recovering the latter compound.

7. A process for the preparation of 2-chlorobicyclo[2.2.1]-2,5-heptadiene which comprises reacting cyclopentadiene at a temperature of from about atmospheric to about 250° C. with 1,1,2-trichloroethylene in a molar ratio to form 5,5,6-trichlorobicyclo[2.2.1]-2-heptene, partially dehalogenating said heptene by reaction with zinc at a temperature of from about 50° C. to about 250° C. in the presence of ethanol to form 2-chlorobicyclo[2.2.1]-2,5-heptadiene, and recovering the latter compound.

8. A process for the preparation of 2-bromobicyclo[2.2.1]-2,5-heptadiene which comprises reacting cyclopentadiene at a temperature of from about atmospheric to about 250° C. with 1,1,2-tribromoethylene in a molar ratio to form 5,5,6-tribromobicyclo[2.2.1]-2-heptene partially dehalogenating said heptene by reaction with zinc at a temperature of from about 50° C. to about 250° C. in the presence of ethanol to form 2-bromobicyclo[2.2.1]-2,5-heptadiene, and recovering the latter compound.

9. A process for the preparation of 2-chloro-3-methylbicyclo[2.2.1]-2,5-heptadiene which comprises reacting cyclopentadiene at a temperature of from about atmospheric to about 250° C. with 1,1,2-trichloro-1-propene in a molar ratio to form 5,5,6-trichloro-6-methylbicyclo[2.2.1]-2-heptene, partially dehalogenating said heptane by reaction with zinc at a temperature of from about 50° C. to about 250° C. in the presence of ethanol to form 2-chloro-3-methylbicyclo[2.2.1]-2,5-heptadiene, and recovering the latter compound.

10. A process for the preparation of 2-chlorobicyclo[2.2.1]-2,5-heptadiene which comprises reacting cyclopentadiene at a temperature of from about atmospheric to about 250°C. with 1,1,2-trichloroethylene in a molar ratio to form 5,5,6-trichlorobicyclo[2.2.1]-2-heptene, partially dehalogenating said heptene by reaction with zinc at a temperature of from about 50° C. to about 250° C. in the presence of ethanol to form 2-chlorobicyclo[2.2.1]-2,5-heptadiene, and recovering the latter compound.

11. A process for the preparation of 2-chlorobicyclo[2.2.1]-2,5-heptadiene which comprises reacting cyclopentadiene at a temperature of from about atmospheric to about 250° C. with 1,1,2-trichloroethylene in a molar ratio to form 5,5,6-trichlorobicyclo[2.2.1]-2-heptene, partially dehalogenating said heptene by reaction with zinc at a temperature of from about 50° C. to about 250° C. in the presence of propanol to form 2-chlorobicyclo[2.2.1]-2,5-heptadiene, and recovering the latter compound.

12. A process for the preparation of a halobicycloalkadiene which comprises dehalogenating a polyhalobicycloalkene containing at least one halogen atom on each of two adjacent carbon atoms by reaction with a metal in the right-hand column of group II of the periodic table at a temperature of from about 50° C. to about 250° C. in the presence of an organic solvent to form a halobicycloalkadiene, and recovering the latter compound.

13. A process for the preparation of 2-chlorobicyclo[2.2.1]-2,5-heptadiene which comprises dehalogenating 5,5,6-trichlorobicyclo[2.2.1]-2-heptene by reaction with zinc at a temperature of from about 50° C. to about 250° C. in the presence of an alcohol to form 2-chlorobicyclo[2.2.1]-2,5-heptadiene, and recovering the latter compound.

14. A process for the preparation of 2-bromobicyclo[2.2.1]-2,5-heptadiene which comprises dehalogenating 5,5,6-tribromobicyclo [2.2.1]-2-heptene by reaction with zinc at a temperature of from about 50° C. to about 250° C. in the presence of an alcohol to form 2-bromobicyclo[2.2.1]-2,5-heptadiene, and recovering the latter compound.

15. A process for the preparation of 2-chloro-3-methylbicyclo[2.2.1]-2,5-heptadiene which comprises partially dehalogenating 5,5,6-trichloro-6-methylbicyclo[2.2.1]-2-heptene by reaction with zinc at a temperature of from about 50° C. to about 250° C. in the presence of an alcohol to form 2-chloro-3-methylbicyclo[2.2.1]-2,5-heptadiene, and recovering the latter compound.

References Cited in the file of this patent

UNITED STATES PATENTS

| | | |
|---|---|---|
| 2,351,311 | Alder et al. | June 13, 1944 |
| 2,401,897 | Benning et al. | June 11, 1946 |
| 2,590,433 | Blum | Mar. 25, 1952 |

OTHER REFERENCES

"Newer Methods of Preparative Organic Chemistry," 1948 (Interscience Publishers), pp. 450–1.